United States Patent [19]

Schepers

[11] Patent Number: 4,690,298
[45] Date of Patent: Sep. 1, 1987

[54] REMOTELY-HANDLED REPLACEABLE COMPONENT

[75] Inventor: Erwin Schepers, Haltern, Fed. Rep. of Germany

[73] Assignee: Deutsche Gesellschaft für Wiederaufarbeitung von Kernbrennstoffen mbH, Hanover, Fed. Rep. of Germany

[21] Appl. No.: 845,173

[22] Filed: Mar. 27, 1986

[30] Foreign Application Priority Data

Apr. 4, 1985 [DE] Fed. Rep. of Germany ....... 3512467

[51] Int. Cl.⁴ .............................................. B65D 45/16
[52] U.S. Cl. ................................................... 220/325
[58] Field of Search ................................ 220/325, 260

[56] References Cited

U.S. PATENT DOCUMENTS 3,819,479 6/1974 Jacquelin ............................. 220/325
4,128,233 12/1978 Eysn et al. ........................... 220/325

Primary Examiner—George T. Hall
Attorney, Agent, or Firm—Walter Ottesen

[57] ABSTRACT

The invention relates to a component which is replaceable be remote control and which in the installed condition is releasably secured to a stationary component. In the remote handling art, there is a need to be able to exchange components, which are replaceable under remote control, safely, rapidly and reliably with remote handling equipment which is of maximum simplicity and with a small number of remote handling steps. For that purpose, at least two locking devices are provided laterally on the replaceable component. Each locking device has a perpendicularly mounted carrier on which a locking claw is pivotally mounted. The locking claws are provided with guide slots. Lateral guide trunnions of an entrainment member are provided with a threaded bore and engage the guide slots so that the entrainment member can be moved vertically by an elongated threaded actuating member which is fixed axially in position so that it remains at the same elevation. The locking claw can thus engage the stationary component from below.

5 Claims, 4 Drawing Figures

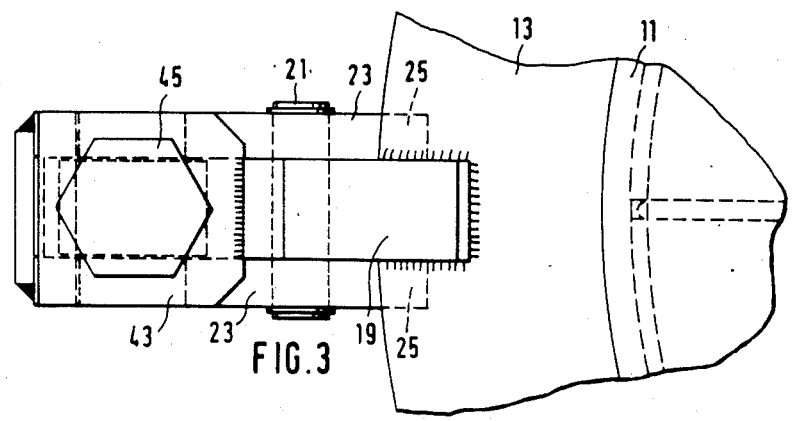
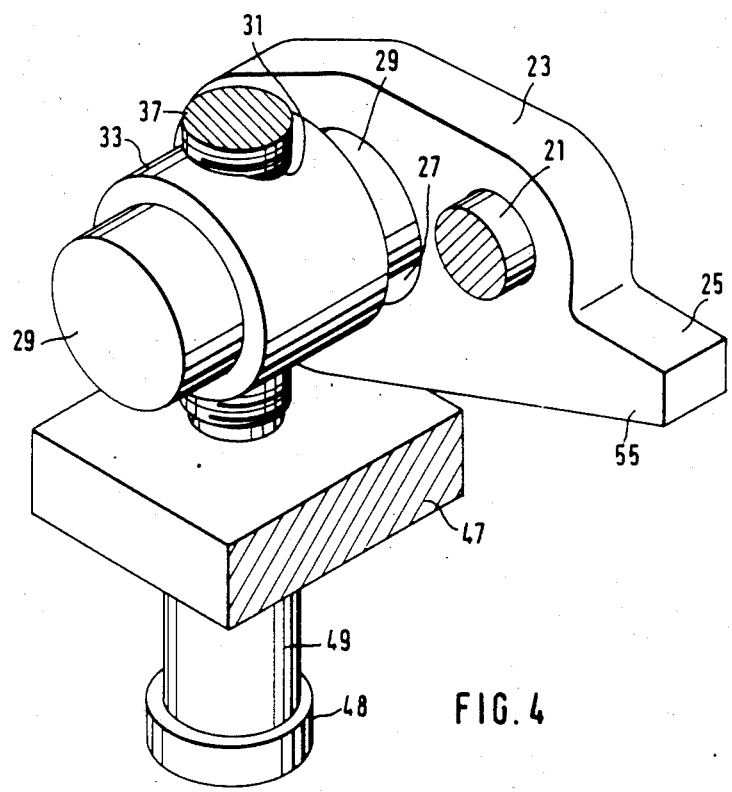

REMOTELY-HANDLED REPLACEABLE COMPONENT

FIELD OF THE INVENTION

The invention relates to a replaceable component which can be replaced under remote control. The replaceable component is adapted for being removably mounted on a stationary component and is especially for use in a large-area processing cell for reprocessing irradiated nuclear fuel.

BACKGROUND OF THE INVENTION

Installations for reprocessing irradiated nuclear fuels have so-called large-area hot cells for accommodating process components. The process components are set up in stands or frame structures known as racks which are arranged in the large-area hot cells which are radiation-shielded.

In these cells, which are not directly accessible, certain components such as changeover components, containers and other fitments must be replaced by means of movable remote handling machines and remote operating equipment. Therefore, when arranging the components which can be replaced under remote control, it is necessary to bear in mind that they are to be readily accessible and their configuration takes account of the difficult conditions with regard to assembly and disassembly under conditions of remote control.

The requirements with respect to a design which is suitable for remote handling, for the installation components which can be replaced under remote control, are to the effect that safe, rapid and reliable replacement is to be guaranteed, with remote handling equipment which is of the utmost simplicity and with a small number of remote handling steps.

SUMMARY OF THE INVENTION

It is an object of the invention to provide a component of the kind described above, which can be replaced by remote control and for which the fitting and removal operations can be carried out quickly and easily while securely fixing the replaceable component to the stationary component. The replaceable component according to the invention substantially facilitates the remote handling operation.

The remotely-handled replaceable component according to the invention is adapted for being removably mounted on a stationary component. The replaceable component is especially for use in a large-area processing cell for reprocessing irradiated nuclear fuel and includes: a body defining the replaceable component; and, at least two locking devices mounted laterally on the body.

Each of the locking devices includes a carrier mounted on the replaceable component; locking lever means pivotally mounted on the carrier for moving between a first position whereat the locking lever means is disengaged from the stationary component and a second position whereat the locking lever means is engaged with the stationary component for locking the replaceable component thereto; entrainment means for entraining the locking lever means; and, actuator means mounted on the carrier for displacing the entrainment means to pivotally drive the locking lever means between the above-mentioned positions.

The actuator means can include an elongated threaded actuating member which engages the entrainment means. The locking lever means can include a pair of locking claws and pivot bearing means for pivoting mounting the locking claws on the carrier. On the other hand, the entrainment means can include respective slots formed in the locking claws and an entrainment member having trunnions formed thereon for engaging corresponding ones of the slots.

According to another feature of the invention, bracket means can be provided for holding the threaded actuating member in position so that it is not displaced in the direction of its longitudinal axis when rotated for moving the entrainment member.

After the replaceable component has been fitted onto the stationary component, the threaded actuating member is actuated and rotated by means of a remote-controlled driver. It is in this respect that an important advantage of the invention becomes clear, which is that the actuating member does not alter its axial position. The remote handling apparatus for actuating the actuating member does not have to follow a movement of the actuating member along its longitudinal axis.

By virtue of the threaded actuating member being rotated, the entrainment member which is guided in the locking claw with its lateral guide trunnions is moved downwardly. Due to this downward movement, the locking claw pivots about the stationary pivot point on the carrier so that the locking surface or surfaces of the locking claws pivot upwardly out of the contour of the carrier and engage under the stationary component at the location of contact engagement therewith until the replaceable component is clamped fast.

The replaceable component is removed by reversing the sequence of operating steps.

The replaceable component according to the invention has the advantage that, in the event that the thread jams, the locking device can be released by simply severing the threaded actuating member in the region of the spacer sleeve. After the severing operation, the threaded actuating member is pulled upwardly and thus the locking action is eliminated. The replaceable component can be easily replaced together with the locking device. No repair operations are required on the fixed component.

By providing a pair of locking claws, a uniform application of force is achieved which prevents the locking device from tilting.

In an advantageous embodiment of the invention, the perpendicularly mounted carriers have an inclined centering surface at their lower inside edge. The centering surface may be at about 20° with respect to the vertical and helps in centering the replaceable component if, for example, there are two installing flanges which are of equal diameters.

The invention provides a replaceable component which can be replaced by remote control and which is extremely advantageous with regard to the remote handling procedures which are necessary in the replacement operation. An aspect considered to be of particular advantage is that the arrangement of the replaceable component according to the invention does not substantially alter the amount of space it requires in the installed or in the removed condition.

BRIEF DESCRIPTION OF THE DRAWING

An embodiment of the invention will now be described in greater detail with reference to the drawing. For the sake of simplicity of the drawing, components and items of equipment which do not contribute to an understanding of the invention are not shown in the drawing in which:

FIG. 3 is a plan view of the apparatus shown in FIGS. 1 and 2; and,

FIG. 4 is a perspective view of the entrainment member of the locking device with lateral guide trunnions for engaging guide slots of the locking claws.

DESCRIPTION OF THE PREFERRED EMBODIMENT OF THE INVENTION

Figure 1:
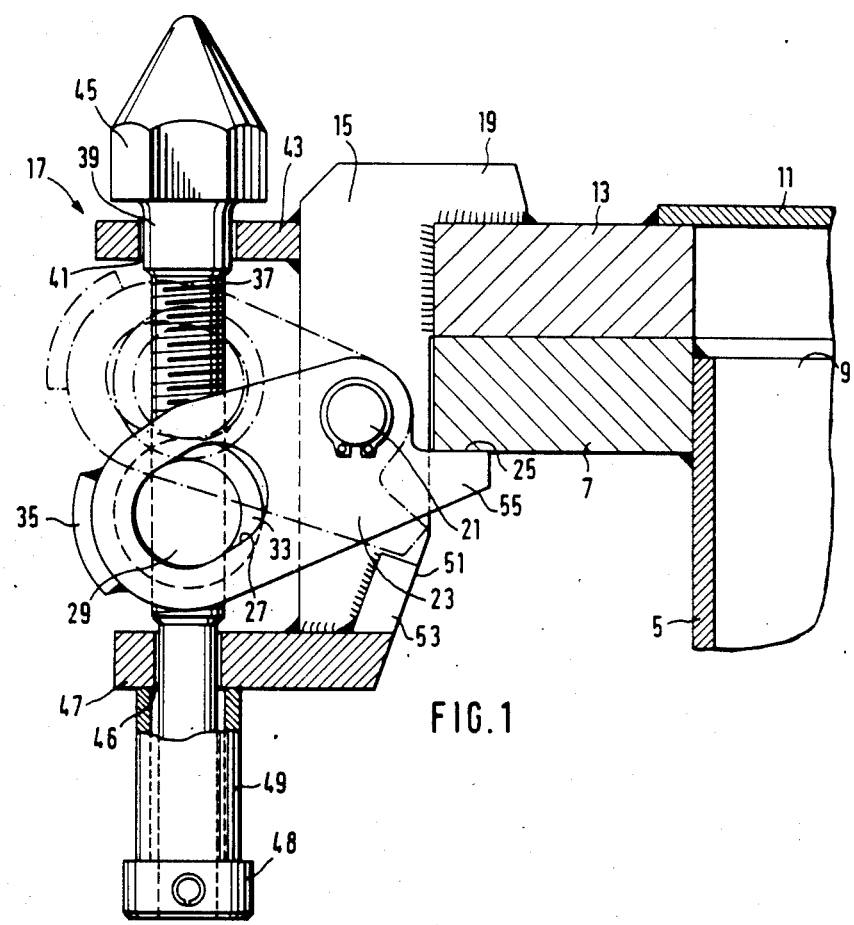
FIG. 1 is a side elevation view, partially in section, of a replaceable cover which can be replaced by remote control and which is fitted onto a container having a peripheral counter flange for receiving the cover thereon.

FIG. 1 shows a container 5 which is stationary and which is surrounded at its upper free end by a peripheral flange 7. The opening 9 of the container 5 is covered over by an exchangeable cover 11 having an annular flange 13 welded thereto. The cover 11 lies with its flange 13 on the flange 7 of the container 5.

Four perpendicular carriers 15 of four locking devices 17 are welded laterally to the annular flange 13 by way of respective upper angle members 19. Of the four locking devices 17, only one is illustrated herein for the sake of simplicity. The other locking devices 17 are of the same configuration.

Below the weld joint, the carrier 15 has a horizontally disposed pivot pin 21 on which two locking claws 23 of a pair are rotatably mounted.

Figure 2:
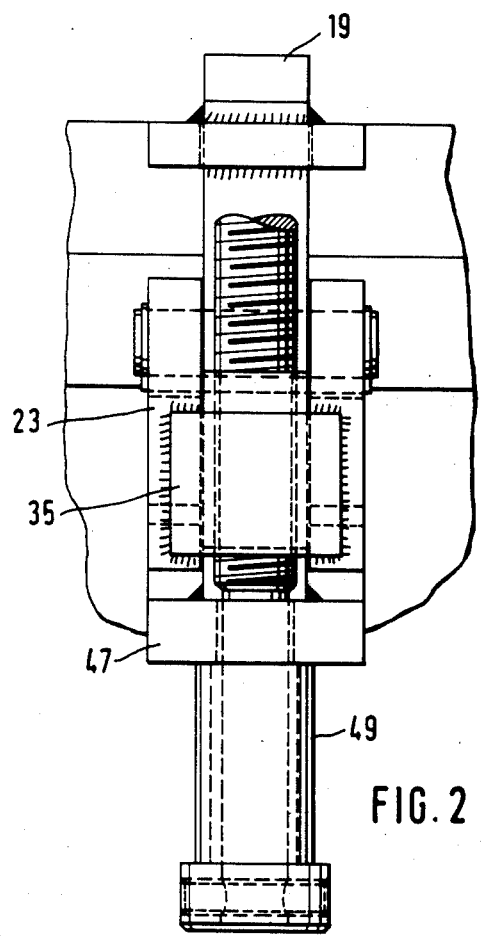
FIG. 2 is a rear elevation view of the replaceable cover of FIG. 1 showing the threaded actuating member with a portion thereof broken away.

The locking claws 23 each have an upwardly facing locking surface 25 which in the locked condition engages under the flange 7 on the container 5. The locking claws 23 have guide slots 27 at a spacing from the stationary pivot point 21. Lateral guide trunnions 29 of an entrainment member 33 engage guide slots 27. The entrainment member 33 has a threaded bore 31. The length of the guide slot 27 is selected to correspond to the necessary compensating movement associated with the pivotal motion of the locking claws 23. On their outwardly disposed faces, the locking claws 23 are fixedly welded together by means of a shell-like portion 35 as shown in FIG. 2.

The entrainment member 33 is of a cylindrical configuration and is disposed with its longitudinal axis perpendicular to the longitudinal axis of a threaded actuating member 37 which threadably engages the threaded bore 31 in the entrainment member 33. At the upper end, the actuating member 37 engages with a guide shoulder 39 through a guide hole 41 in guide plate 43 which is welded horizontally to the perpendicular carrier 15, and has a hexagonal actuating head 45 above the guide plate 43.

The end region of the actuating member 37 extends through a guide hole 46 in a guide plate 47 which is horizontally welded to the perpendicular carrier at the lower end thereof and projects beyond the guide plate 47. The end of the actuating member 37 is provided with a pinned spacer ring 48. Between the spacer ring 48 and the guide plate 47, the actuating member 37 is enclosed by a spacer sleeve 49.

In the lower region, on its inside surface, the perpendicular carrier 15 has an inclined centering surface 51 which widens in a downward direction and which also extends over the guide plate 47. The centering surface 51 is at an angle of 20° to the perpendicular.

An abutment portion 53 is welded to the carrier 15 laterally thereof in the region of the centering surface 51 and serves as a limit stop for the locking projection 55 of the locking claw 23.

The mode of operation of the above-described apparatus is explained below.

The cover 11 is moved to its location of installation by means of a lifting apparatus. At that location, it is lowered onto the opening 9 of the container. The cover 11 is centered relative to the opening 9 of the container by means of the centering surfaces 51.

After the cover 11 has been set down, the threaded actuating member 37 is rotated by gripping and rotating the actuating head 45 by means of a driver which hangs, for example, from a crane or another manipulator carrier. When this operation is carried out, the direction of rotation is selected so as to cause the entrainment member 33 to move downwardly on the threaded portion of the threaded actuating member 37. The downward movement of the entrainment member 33 causes the locking claws 23 to pivot about their fixed pivot point 21 so that the locking projections 55 pivot upwardly and the locking surfaces 25 are pressed from below against the flange 7 of the container 5. The cover 11 is securely and firmly clamped in position on the container 5.

In this locking operation, the actuating head 45 always remains at the same elevation so that there is no need for a follow-up movement of the crane or other manipulator equipment which carries the impact wrench. From the point of view of the operator carrying out the locking operation, this substantially simplifies the remote handling operation which the operator performs only by viewing on a monitor.

It is understood that the foregoing description is that of the preferred embodiments of the invention and that various changes and modifications may be made thereto without departing from the spirit and scope of the invention as defined in the appended claims.

What is claimed is:

1. A remotely handled-replaceable component adapted for being removably mounted on a stationary component, the replaceable component being especially for use in a large-area processing cell for reprocessing irradiated nuclear fuel, the replaceable component comprising:

a body defining the replaceable component;

at least two locking devices mounted laterally on said body, each of said locking devices including:

a carrier mounted on said replaceable component;

locking lever means pivotally mounted on said carrier for moving between a first position whereat said locking lever means is disengaged from said stationary component and a second position whereat said locking lever means is engaged with said stationary component for locking said replaceable component thereto;

entrainment means for entraining said locking lever means; and, actuator means mounted on said carrier for displacing said entrainment means to pivotally drive said locking lever means between said positions.

2. The replaceable component of claim 1, said locking lever means including: a pair of locking claws; and, pivot bearing means for pivotally mounting said locking claws on said carrier;

said entrainment means including respective elongated slots formed in said locking clows so as to be spaced from said pivot bearing means; an entrainment member having trunnions formed thereon for engaging corresponding ones of said slots;

said actuator means including a threaded bore formed in said entrainment member; and, an elongated threaded actuating member extending through said bore and threadably engaging said entrainmant member;

said actuating member having an actuating head formed on one end thereof adapted for engagement with a driving tool by means of which said actuating member is rotatable about its longitudinal axis for displacing said entrainment member; and, bracket means for accommodating said actuating member in spaced relationship to said carrier and for preventing said actuating member from being displaced along said longitudinal axis in response to the rotational movement imparted by said driving tool.

3. The replaceable component of claim 2, said bracket means including upper and lower guide pieces attached to said carrier, said guide pieces having respective guide bores formed therein for accommodating said actuating member and for holding the same in spaced relationship to said carrier; said actuating head being formed on the upper end of said actuating member and the lower end portion of said actuating member extending downwardly beyond said lower guide piece; and, said actuator means including a spacer ring attached to said actuating member at the lower end of said end portion and a spacer sleeve disposed in surrounding relationship to said actuating member and between said spacer ring and said lower guide piece.

4. The replaceable component of claim 3, said pair of locking claws being disposed in spaced relationship to each other so as to straddle said carrier at one end thereof and so as to straddle said entrainment member at the other end thereof, said locking claws having respective end faces facing away from said carrier, said lever means including a connecting member for connecting said locking claws to each other.

5. The replaceable component of claim 4, said carrier having a downwardly and outwardly extending surface for contact engaging said stationary component to center said replaceable component vis-a-vis said stationary component as the former is lowered into position on the latter.

* * * * *

UNITED STATES PATENT AND TRADEMARK OFFICE
CERTIFICATE OF CORRECTION

PATENT NO. : 4,690,298

DATED : September 1, 1987

INVENTOR(S) : Erwin Schepers

It is certified that error appears in the above-identified patent and that said Letters Patent is hereby corrected as shown below:

On the first page of the patent, in the Abstract, line 2: delete "be" and substitute -- by -- therefor.

In column 2, line 2: delete "pivoting" and substitute -- pivotally -- therefor.

In column 3, line 45: delete "thc" and substitute -- the -- therefor.

In column 4, line 43: delete "handled-replaceable" and substitute -- handled replaceable -- therefor.

In column 5, line 2: delete "clows" and substitute -- claws -- therefor.

Signed and Sealed this

Twelfth Day of January, 1988

Attest:

*Attesting Officer*

DONALD J. QUIGG

*Commissioner of Patents and Trademarks*